United States Patent [19]

Czajkowski

[11] Patent Number: 4,644,513
[45] Date of Patent: Feb. 17, 1987

[54] ELECTRICAL CIRCUITS FOR TIMING SIGNALS

[75] Inventor: Stanislaw B. Czajkowski, Limerick, Ireland

[73] Assignee: Sonic Tape P.L.C., London, England

[21] Appl. No.: 685,479

[22] Filed: Dec. 24, 1984

[30] Foreign Application Priority Data

Dec. 23, 1983 [GB] United Kingdom ............... 8334394

[51] Int. Cl.$^4$ .................................................. G01S 15/02
[52] U.S. Cl. ....................................... 367/108; 367/99; 367/98; 367/95; 342/134
[58] Field of Search ................... 367/99, 108, 98, 95, 367/87; 343/13 R, 7 VM; 307/518; 324/78 R, 102; 328/120, 157; 377/2, 20

[56] References Cited

U.S. PATENT DOCUMENTS

| 3,447,155 | 5/1969 | Webb | 343/13 R |
| 3,824,464 | 7/1974 | Rotier et al. | 367/98 |
| 4,420,824 | 12/1983 | Weber | 367/98 |

FOREIGN PATENT DOCUMENTS 2059590 4/1981 United Kingdom .................. 367/98

Primary Examiner—Thomas H. Tarcza
Assistant Examiner—Daniel T. Pihulic
Attorney, Agent, or Firm—Young & Thompson

[57] ABSTRACT

From a first aspect this invention provides a missing pulse detector for determining the true termination time of a sequence of pulses in a signal of an assumed predetermined length having a rising edge and a trailing edge which may include pulses which do not reach a predetermined threshold, the detector including a counter connected to count pulses exceeding said threshold, up to a predetermined number, an oscillator for producing pulses at twice the frequency of the pulses in the signal and an enabling circuit for allowing pulses from the oscillator to pass to the counter only after the termination of a sequence of threshold-exceeding pulses from the signal.

10 Claims, 5 Drawing Figures

ELECTRICAL CIRCUITS FOR TIMING SIGNALS

This invention relates to various electrical circuits particularly, but not exclusively, those which are useful in an automatic distance measuring apparatus.

Distance measuring apparatus is known wherein a sonic or ultrasonic pulse is transmitted and the time taken between the transmission and the return echo is measured to determine the total distance travelled by the pulse, and hence the distance of the object reflecting the pulse.

Existing distance measuring apparatus of the above kind have several major drawbacks and it is the object of this invention to alleviate these.

From a first aspect this invention provides a missing pulse detector for determining the true termination time of a sequence of pulses in a signal of an assumed predetermined length having a rising edge and a trailing edge which may include pulses which do not reach a predetermined threshold, the detector including a counter connected to count pulses exceeding said threshold, up to a predetermined number, an oscillator for producing pulses at twice the frequency of the pulses in the signal and an enabling circuit for allowing pulses from the oscillator to pass to the counter only after the termination of a sequence of threshold-exceeding pulses from the signal.

Assuming that the sequence of pulses in the signal is generally symmetrical, an equal number of pulses will be lost from the beginning of the signal as from the end, should any pulses fail to reach the predetermined threshold. Hence adding on twice the number of pulses at double the frequency to the end of the count of pulses which have exceeded the threshold will result in a total count (up to the predetermined number) terminating approximately at the instant of receipt of the end of the trailing edge of the signal. Thus the true termination time of the signal is correctly determined.

In the preferred arrangement the connection of the oscillator to the counter for the supply of double frequency pulses is through a latch-controlled unit which is connected to receive the sequence of threshold-exceeding pulses from the signal. This latch-controlled unit ideally will include a counter. When the normal pulses are passing through, the counter will be re-set by each of these pulses after only two pulses have been received from the oscillator, but when the sequence of normal pulses terminates the third pulse from the oscillator will be registered by the counter of the latch-controlled unit so that the latch will be set. It is also of advantage to include a latch connected to be set by a first threshold-exceeding pulse received in said signal to initiate operation of the oscillator.

The invention also extends to a reflected signal measuring circuit including a missing pulse detector as hereinbefore defined and a circuit for transmitting a sequence of pulses and receiving any reflection of that sequence for supply to the missing pulse detector. Such a signal measuring circuit will advantageously include combined resetting inputs to the counter and any latches in the circuit which will receive a resetting signal upon initiation of transmission of said sequence. The output from the counter may itself be connected to the combined resetting inputs through a delayed re-set circuit.

The signal measuring circuit will preferably include a calculation and display unit for determining the time between the transmission of the sequence of pulses and the provision of an output from said counter upon receipt of said predetermined number of pulses and converting the time to an indication of distance travelled by the reflected sequence of pulses for display on the display unit.

According to a further aspect of the invention, there is provided a reflected signal measuring circuit provided with an amplifier circuit having a variable gain which is highly linear with respect to an input gain control signal.

When used in the receiver circuit of a distance measuring apparatus the variable gain linear amplifier circuit is preferably connected in series with a pair of fixed gain band pass amplifier circuits. The two band pass amplifiers provide a highly selective amplification of the frequency of the sonic or ultrasonic signal used in the apparatus. Finally, the receiver circuit includes a comparator which compares the output of the band pass amplifiers with a predetermined threshold level.

When the above circuits are used together as part of a distance measuring apparatus, it is preferred that they are formed in a single integrated circuit chip, designated the Denver chip. This has the advantage that all the transistors and other components of the amplifiers and comparator will "drift" at the same rate, largely compensating each other. However, the components which determine the band pass characteristics and the gain are preferably outside the chip proper so that these can be adjusted as desired.

The invention may be performed in various ways and a preferred embodiment thereof will now be described with reference to the accompanying drawings, in which.

Figure 1:
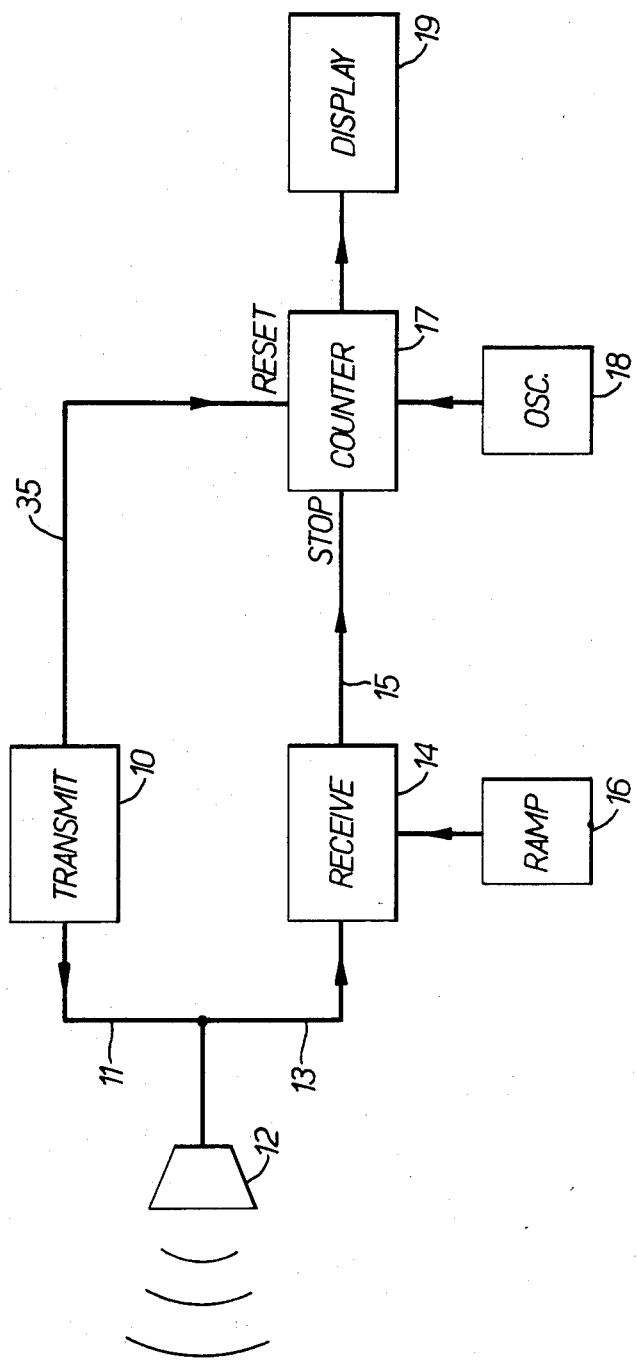
FIG. 1 is a block schematic diagram of a distance measuring apparatus in which the circuits according to the invention have utility.

The apparatus shown in FIG. 1 includes a transmitter circuit 10 which is arranged to supply timed bursts via line 11 to a directional electroacoustic transducer 12. Each reflection by an object in the path of the signal is detected by the same transducer 12 for reconversion to electrical form. The detected bursts (echoes) are passed via a line 13 to a receiver circuit 14 for amplification and detection.

The receiver circuit 14 discriminates large amplitude echoes reflected from a wall or other large surface, whose distance it is required to measure, from noise or echoes of lesser magnitude reflected from relatively small objects such as a chair (when measuring inside a building) or a post (when measuring outside). Thus the receiver circuit 14 is tuned to reject unwanted frequencies and includes means for comparing the amplified echo signals with a reference threshold level set sufficiently high to reject small echoes yet provide an output on line 15 for large amplitude echoes.

It is necessary to compensate for the attenuation of sound in air which is substantially linear at 6 db per 1½ meters of distance travelled at 25° C. For this purpose the receiver circuit 14 includes a variable gain amplifier which is fed with a linear ramp control signal derived from a ramp generator 16. The ramp control signal is at a maximum when the ultrasonic burst is transmitted, and thereafter decreases linearly with time to compensate for the attenuation of the sonic signals in air. Thus the magnitude of the processed echo signal from the amplifier output presented for comparison with a fixed threshold is substantially constant irrespective of the distance between the transducer and a large area object, subject to the maximum gain of the amplifier. Naturally, the receiver circuit also includes means for rendering such circuit unresponsive to the initial transmission burst.

The time between each transmitted burst and the detected echo burst after reflection is a measure of the distance of the object from the transducer. This time interval is determined by a counter 17 which counts clock pulses provided by an oscillator 18. The counter is re-set to zero by a pulse on line 35 each time a burst is transmitted, and stopped at its current count by a pulse on line 15 each time a reflected burst is detected which is of sufficient amplitude to trigger the comparison means in the receiver circuit 14. The current count may be displayed at 19 directly in desired units of length corresponding to the distance between the transducer 12 and the object, by providing an appropriate choice of the frequency of the oscillator 18 or by the use of suitable division circuits.

Figure 2:
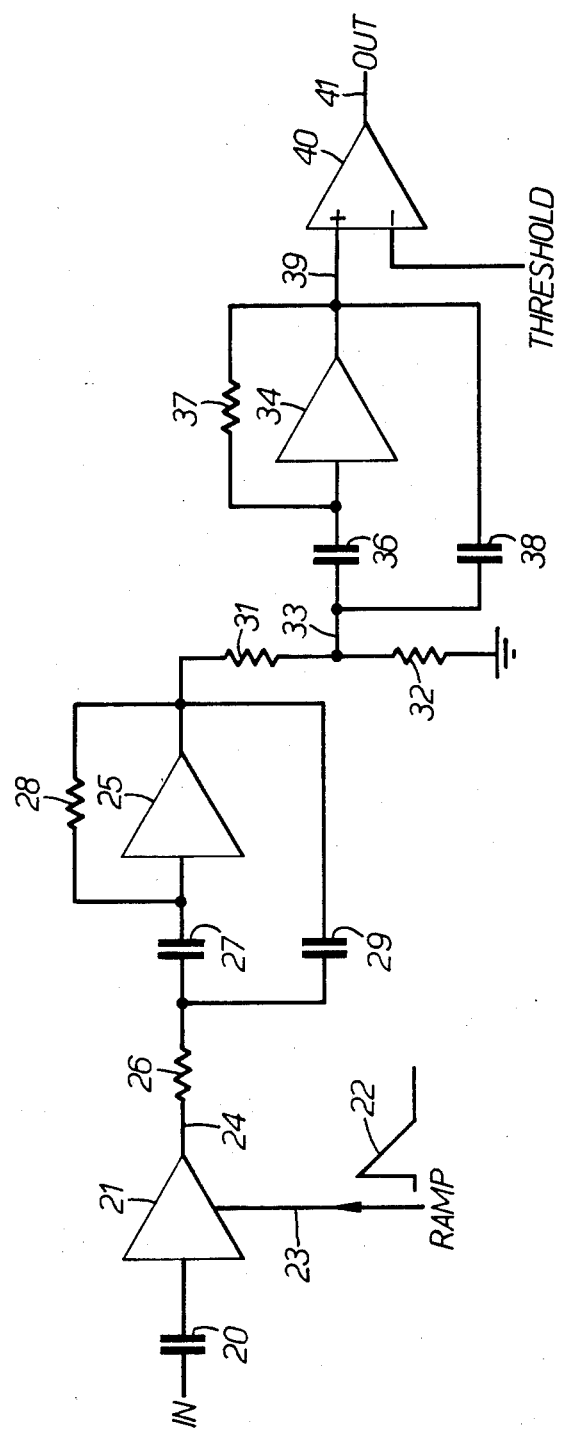
FIG. 2 is a block circuit diagram of a receiver circuit including a variable gain linear amplifier, together with a pair of fixed gain band pass amplifier circuits and a comparator.

Referring to FIG. 2, the receiver circuit comprises an input capacitor 20 via which a reflected echo signal from the transducer 12 (FIG. 1) is supplied to a highly linear variable gain amplifier 21. The maximum value of the input signal, after pre-amplification and some filtering (not shown) corresponds to the reflection from a large area wall close to the transducer 12. However, the gain of the amplifier 21 is controlled by a ramp signal 22 supplied at 23 in such manner that the output 24 is a substantially constant peak to peak irrespective of the distance of the wall from the transducer, as hereinbefore described.

The output 24 of the amplifier 21 is passed to a first amplifier circuit comprising a fixed gain operational amplifier 25 having a high pass filter comprising a resistor 26 and a capacitor 27 and a low pass filter comprising a resistor 28 and a capacitor 29. The output signal at 30 is applied, to a second fixed gain band pass amplifier circuit similar to the first. The signal at the input 33 to the second amplifier circuit is reduced by the action of the potential divider 31, 32. The second fixed gain amplifier circuit comprises a fixed gain operational amplifier 34 similar to the first amplifier 25, together with a high pass filter comprising the resistor 31 and a capacitor 36 and a low pass filter comprising a resistor 37 and a capacitor 38.

It is to be noted that the use of two fixed gain band pass amplifier circuits in series as described above provides a highly selective frequency response, certainly more selective than a single such amplifier circuit.

When the output signal at 39 exceeds the threshold, as will certainly be the case for large area walls and most large area objects in the field of view of the transducer 12, a logic "1" signal is supplied on the comparator output 41 which corresponds to the output line 15 in FIG. 1. The use of a suitable threshold voltage ensures that neither noise nor small objects such as a chair or post will trigger the comparator, yet allows reasonably large objects to be detected which however do not provide an echo signal of the maximum amplitude such as would be provided by a large area wall. The threshold level may be manually adjusted.

Figure 3:
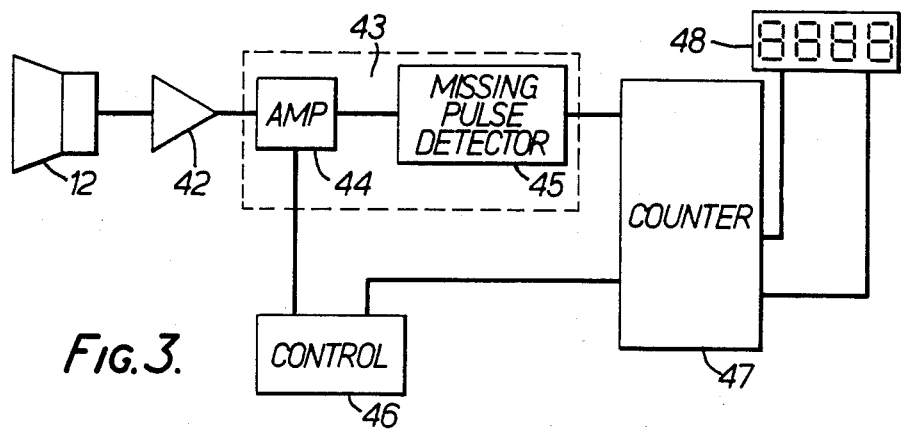
FIG. 3 is a block schematic diagram of the complete circuit for a distance measuring apparatus incorporating a missing pulse detector.

The overall circuit illustrated in FIG. 3 incorporates the transducer 12 connected via a buffer 42 to an integrated circuit chip 43 carrying the gain controlled by-pass amplifiers 44 as illustrated in FIG. 2 and a missing pulse detector circuit 45. A separate control circuit 46 is connected into the portion of the chip 43 carrying the amplifiers 44 to initiate the transmission of a pulse from the transducer 12 and is also connected to a counter 47 so as to supply a re-set signal. Any echo signals received by the circuit pass through the amplifiers 44 and the missing pulse detector 45 and the output is fed to the counter 47. When a predetermined count has been reached by the counter 47 the time between initiation of the transmission pulse from the transducer 12 and the instant when the counter reaches its predetermined level is converted into an indication of the distance travelled by the reflected signal which is then displayed by a display device 48.

Figure 4:
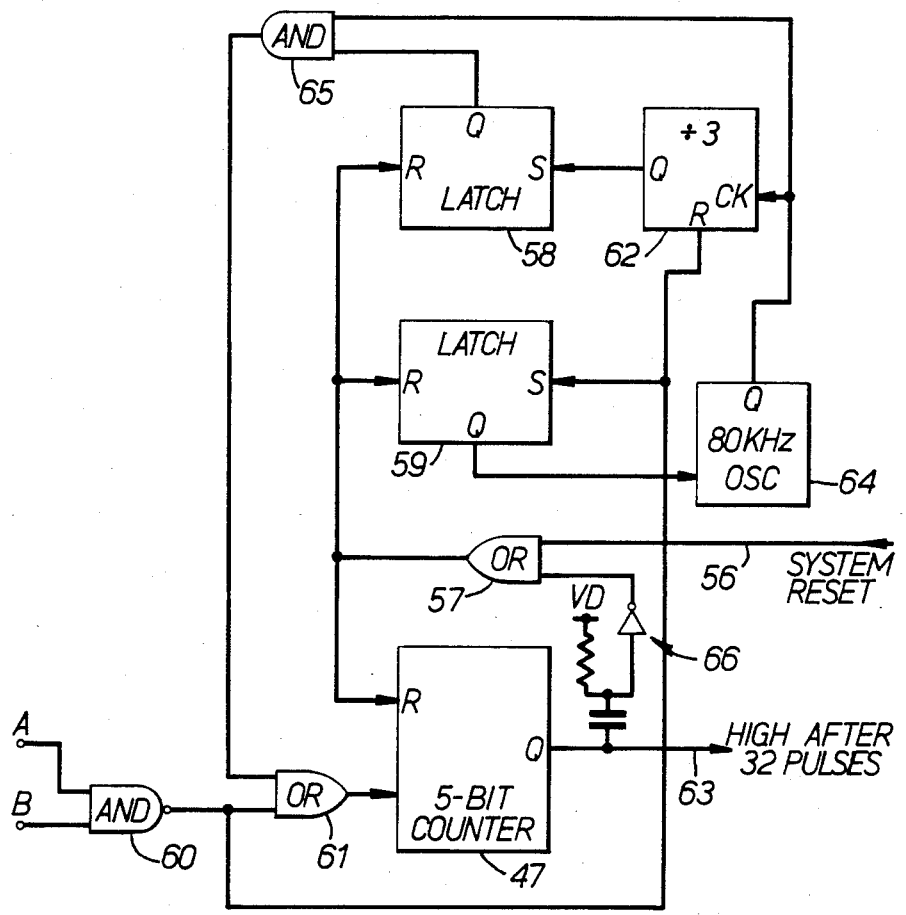
FIG. 4 is a block schematic diagram of the missing pulse detector of FIG. 3.
Figure 5:
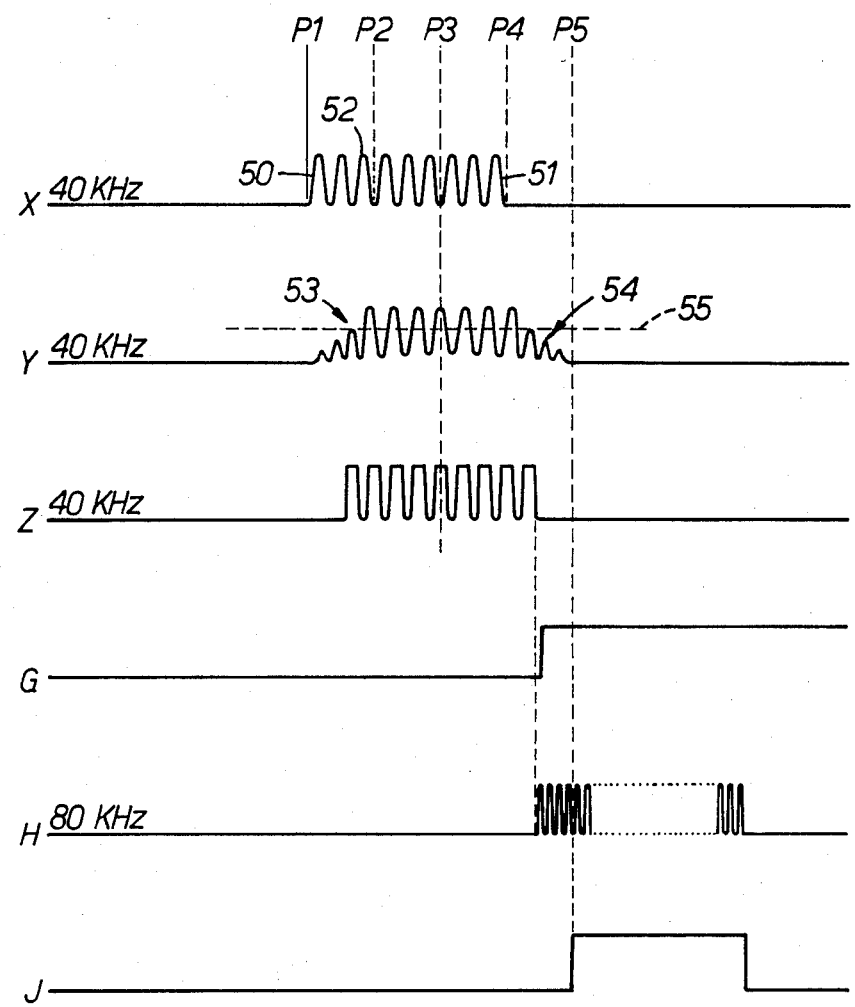
FIG. 5 is an illustration of wave forms for pulses and signals within the missing pulse detector circuit of FIG. 4.

The details of operation of the missing pulse detector can be seen from the circuit diagram of FIG. 4 and the wave forms illustrated in FIG. 5. Referring firstly to FIG. 5 the first wave form X indicates an ideal reflected signal which passes through the amplifier 44. This has a sharp rising edge 50 and trailing edge 51 and all the pulses of the train are approximately of a similar height 52. In reality, however, the signal is more likely to be that represented by the wave form Y having a sloping leading edge 53 for the signal rise time and a downwardly sloping edge 54 for the trailing edge due to ringing of the signal. Generally however the signal will be symmetrical about a centre line P3, the total signal length being from P1 to P5. In operation the detection level 55 will be set resulting in an output from the comparator 40 (FIG. 2) of the form as illustrated by wave form Z. This will provide a train of pulses which are in fact chopped off at the leading and trailing edges and thus the counter 47 may not receive the total number of pulses required to provide an output and if the counter was set at a lower level than the expected number of pulses to be received the timing of the output from the counter would not truly reflect the instant at which the actual trailing edge of the signal was received. The circuit of FIG. 4 aims to overcome this difficulty.

Referring to FIG. 4, when a transmission pulse sequence from the transducer 12 (FIG. 3) is initiated the re-set signal from the control circuit 46 is fed on a line 56 via an OR gate 57 to the re-set inputs of latches 58 and 59 and the counter 47. Any echo passing through the comparator 40 (FIG. 2) is fed from the point A to an AND gate 60 which is gated with a 3.5 ms pulse from point B to disable the circuit whilst the transmission of pulses occurs. The pulse train as illustrated by wave form Z is thus fed into the counter 47 through an OR gate 61 and also operates to set latch 59 and provide a re-setting pulse to a "÷3" counter 62. If a strong signal is received as an echo then all the pulses in the train will pass through to the counter 47. In this example it is assumed that the circuit is designed to emit pulse trains incorporating 32 pulses which will be registered by a 5 bit counter 47 which will therefore go high and produce an output on line 63 after 32 pulses have been registered. However, if less than 32 pulses are received, the last pulse registered will be applied to the re-set input of the counter 62, but since no further pulses will be received to re-set this counter, the counter 62 will, upon receiving three clock pulses from an oscillator 64 go high to provide a setting pulse to the latch 58. The oscillator 64 supplies pulses at twice the frequency of those in the pulse train received at point A. For example the pulse train may have a frequency of 40 kHz whilst the oscillator 64 operates at a frequency of 80 kHz. The oscillator 64 will of course have been enabled by the latch 59 which is set by the pulses passing through the AND gate 60. Once the latch 58 has been set by the output of the counter 62 it will enable one input of an AND gate 65 whose other input is fed from the oscillator 64. Thus, after three pulses have been supplied to the counter 62 from the oscillator 64 after the last re-setting pulse for the counter has passed through the AND gate 60, a stream of pulses will be fed through the AND gate 65 and the OR gate 61 to the counter 47.

Because, as can be seen from the wave forms Y and Z in FIG. 5, the missing pulses are symmetrical at either end of the pulse train, adding on a number of 80 kHz pulses to the end of the truncated 40 kHz pulse train will result in a total pulse count of 32 being achieved at approximately the correct instant as for a complete pulse train of 32 40 kHz pulses. This can be seen from the further wave forms G, H and J illustrated in FIG. 5. G indicates the output state of the counter and shows that it goes high very shortly (1½ normal pulses) after the end of the detected pulse train of wave form Z. Wave form H shows the output from the AND gate 65 as the 80 kHz pulses pass through it and are applied to the counter 47. Finally wave form J shows the instant at which the counter 47 goes high upon receipt of the truncated normal pulse train together with a number of missing pulses supplied at twice the frequency. This instant of output from the counter 47 corresponds approximately to the end of the distorted pulse train as indicated by pulse train Y. The output from the counter 47 is fed through a delayed re-set circuit 66 so that, after a predetermined time, the counter 47 and the two latches 58 and 59 are re-set (as indicated by the termination of the signals of wave forms J and H). The circuits described above are preferably formed in a single integrated chip, designated the Denver chip.

I claim:

1. A missing pulse detector for determining the true termination time of a sequence of pulses in a signal of an assumed predetermined length having a rising edge and a trailing edge, which sequence may include pulses which do not reach a predetermined threshold, the detector including a counter connected to count pulses exceeding said threshold, up to a predetermined number, an oscillator for producing pulses at twice the frequency of the pulses in the signal and an enabling circuit for allowing pulses from the oscillator to pass to the counter only after the termination of a sequence of threshold exceeding pulses from the signal.

2. A missing pulse detector according to claim 1, including a latch-controlled unit which is connected to receive the sequence of threshold-exceeding pulses from the signal, and wherein the connection of the oscillator to the counter for the supply of double frequency pulses is through the latch-controlled unit.

3. A missing pulse detector according to claim 2, wherein the latch-controlled unit includes a counter which will produce an output to set the latch only after receipt of three pulses from the oscillator.

4. A missing pulse detector according to claim 1, including a latch connected to be set by the first threshold-exceeding pulse received in said signal to initiate operation of the oscillator.

5. A reflected signal measuring circuit including a missing pulse detector for determining the true termination time of a sequence of pulses in a signal of an assumed predetermined length having a rising edge and a trailing edge, which sequence may include pulses which do not reach a predetermined threshold, the detector including a counter connected to count pulses exceeding said threshold, up to a predetermined number, an oscillator for producing pulses at twice the frequency of the pulses in the signal and an enabling circuit for allowing pulses from the oscillator to pass to the counter only after the termination of a sequence of threshold exceeding pulses from the signal, the measuring circuit also incorporating a circuit for transmitting a sequence of pulses and receiving any reflection of that sequence for supply to the missing pulse detector.

6. A reflected signal measuring circuit according to claim 5, including combined resetting inputs to the counter and to any latches in the circuit which will receive a resetting signal upon initiation of transmission of said sequence.

7. A reflected signal measuring circuit according to claim 6, including a delayed re-set circuit wherein the output from the counter is connected to the combined re-setting inputs through the delayed re-set circuit.

8. A reflected signal measuring circuit according to claim 5, including a calculation and display unit for determining the time between the transmission of the sequence of pulses and the provision of an output from said counter upon receipt of said predetermined number of pulses and converting the time to an indication of distance travelled by the reflected sequence of pulses for display on the display unit.

9. A reflected signal measuring circuit according to claim 5 and provided with at least one circuit selected from an amplifier circuit having a variable gain which is highly linear with respect to an input gain control signal, the variable gain linear amplifier circuit preferably being connected in series with a pair of fixed gain band pass amplifier circuits, and a comparator circuit which compares the output of the band pass amplifiers with a predetermined threshold level.

10. A reflected signal measuring circuit according to claim 5, wherein the majority of the circuit components are carried by a single integrated circuit chip.

* * * * *